(No Model.)
2 Sheets—Sheet 1.

A. M. MENTZER.
FLUID PRESSURE BRAKE.

No. 541,372. Patented June 18, 1895.

WITNESSES
Geo. E. Frech.
Roland A. Fitzgerald.

INVENTOR
A. M. Mentzer
By Lehmann Pattison Habit
Attys.

THE NORRIS PETERS CO., PHOTO-LITHO., WASHINGTON, D. C.

(No Model.) 2 Sheets—Sheet 2.

A. M. MENTZER.
FLUID PRESSURE BRAKE.

No. 541,372. Patented June 18, 1895.

WITNESSES
Geo. E. Frech.
Roland A. Fitzgerald.

INVENTOR
A. M. Mentzer
By Lehmann Pattison & Nacht
attys

UNITED STATES PATENT OFFICE.

ALONZO M. MENTZER, OF ANDREWS, INDIANA, ASSIGNOR OF ONE-HALF TO JOHN B. HALLER, OF SAME PLACE.

FLUID-PRESSURE BRAKE.

SPECIFICATION forming part of Letters Patent No. 541,372, dated June 18, 1895.

Application filed May 24, 1893. Serial No. 475,321. (No model.)

*To all whom it may concern:*

Be it known that I, ALONZO M. MENTZER, of Andrews, in the county of Huntington and State of Indiana, have invented certain new and useful Improvements in Fluid-Pressure Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in fluid pressure brakes, and it consists in the novel construction and arrangement of parts, whereby a constant pressure of air may be directed from a reservoir to a brake operating mechanism for actuating the same.

The method of applying brakes upon street cars now in general use is both cumbersome and laborious, and the object of my invention, primarily, is to provide an air brake mechanism especially adapted to street car use in which the air is pumped into a reservoir by means of a suitable connection with the running gear and there confined under pressure and from which it may be released for operating the brake mechanism by simply opening a valve within convenient reach of the driver or motorman.

Figure 1:
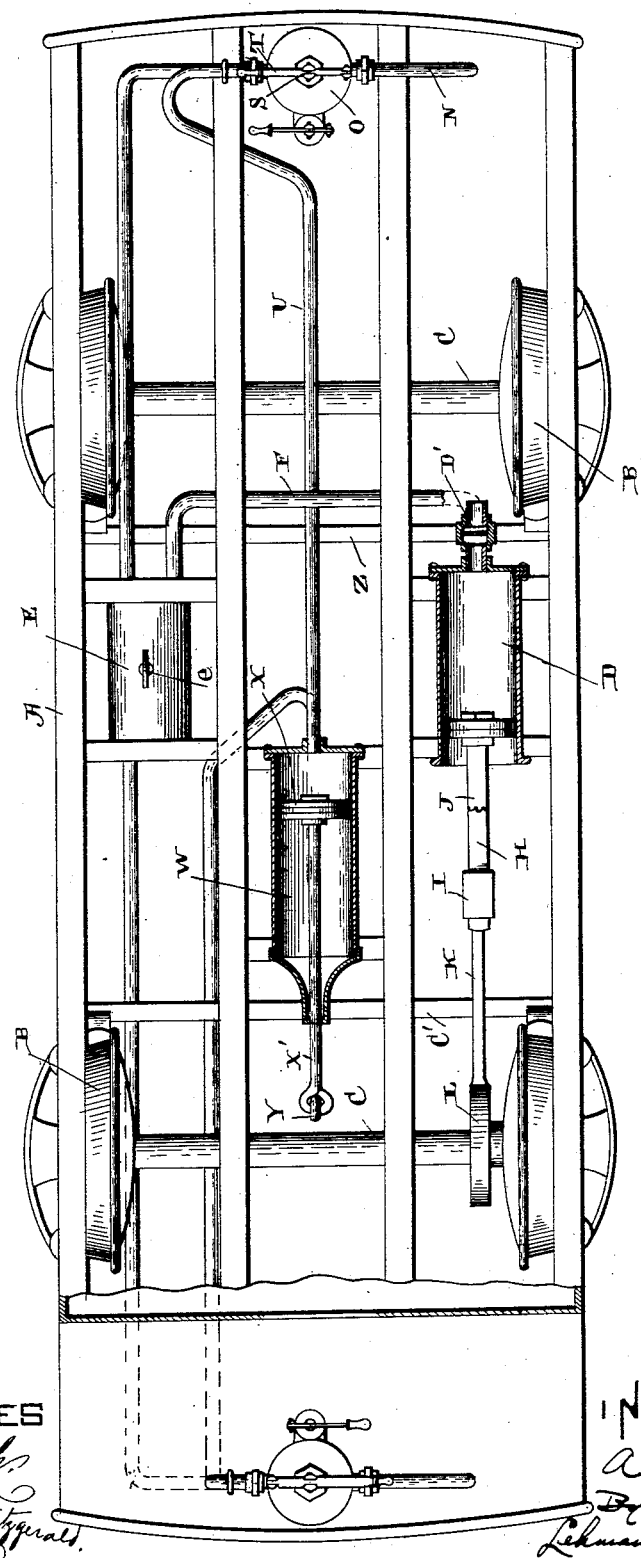
Figure 2:
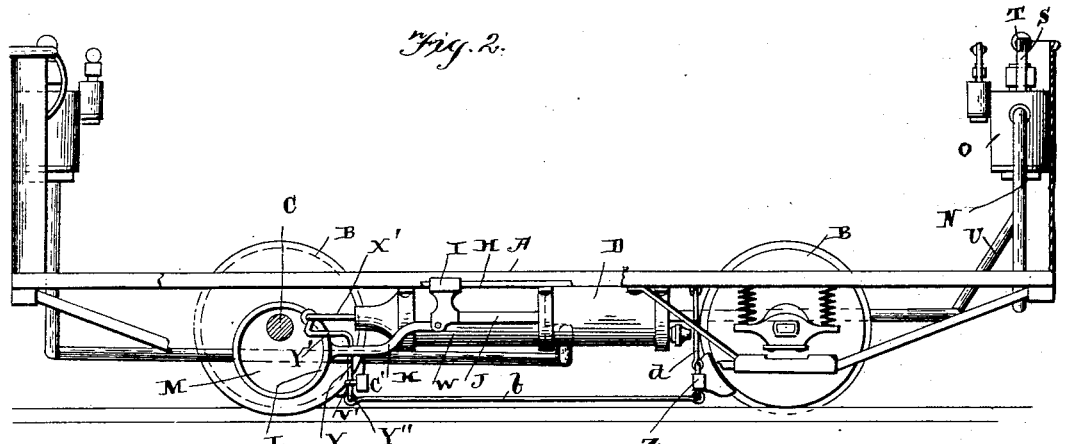
Figure 3:
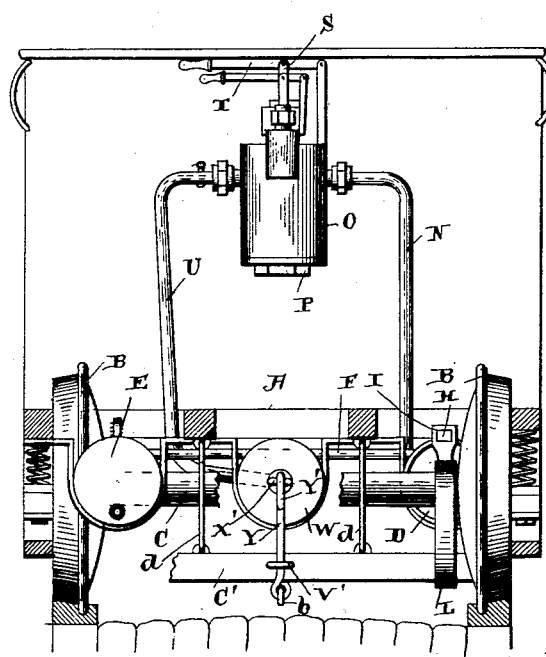
Figure 4:
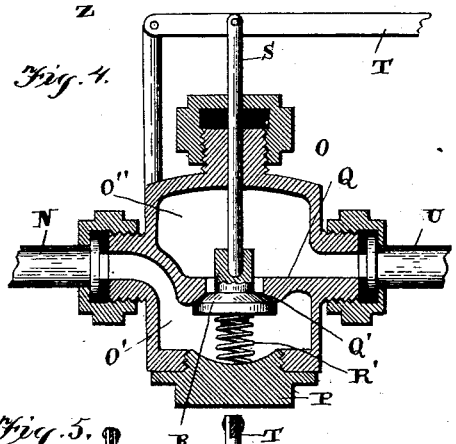
Figure 5:
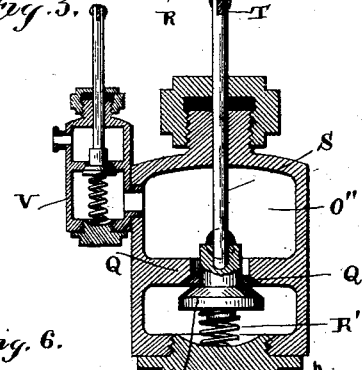
Figure 6:
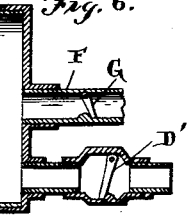

Referring to the accompanying drawings, Figure 1 is a plan view of the base of a car having my improved mechanism applied thereto, the same being shown partly in section. Fig. 2 is a side elevation of Fig. 1, a portion of the same being also shown in section. Fig. 3 is an end view. Figs. 4 and 5 are vertical sections of the valve mechanisms, taken at right angles to each other. Fig. 6 is an enlarged sectional view of one end of the pump-cylinder.

A designates the car base, B the wheels, and C the axles. Secured in any suitable manner to the under side of the base and extending longitudinally therewith is the pumping cylinder D, and directly opposite the same is reservoir E, which is connected with the pumping cylinder by pipe F having a valve G Fig. 6 arranged therein which opens toward the reservoir and away from the pumping cylinder. Supported by and extended rearward from the cylinder D, is bar H upon which moves the cross head I, having secured to its inner side the plunger rod J and pivoted to its outer side rod K. The outer end of this rod K, is formed integral with the ring L, which encircles eccentric M mounted on axle C. Thus it will be seen that as the car is moved forward the pump will be operated and air forced into the reservoir E. An inlet valve D' admits air to the pumping cylinder.

A pipe N is extended forward and upward to a convenient position on the car platform and connected therewith is the valve chamber O, as shown. A downwardly extending passage O' connects pipe N with the base cavity of chamber O, which cavity is formed with the removable bottom or plug P. A partition Q separates the lower cavity O' from the upper cavity O'', and formed in the under side of this partition is a valve seat Q' for the accommodation of the vertically movable valve R which is held in place by coiled spring R', resting upon plug P. By removing the latter it is apparent that the valve may be taken out together with the spring for the purpose of being repaired or for the purpose of substituting a new one. The said valve is depressible through the medium of stem S depending through the valve chamber and cavity O'', being secured at its upper end to the hand lever T which is within convenient reach of the driver or motorman. Thus it will be seen that air can be readily admitted to the cavity O'', and from thence conveyed through pipe U to the brake mechanism presently to be explained.

A small valve chamber V similar in construction to chamber O is supported by the latter and communicates with cavity O'', for the purpose of releasing the air pressure from the brakes when it is desired to free the latter. This smaller relief valve and chamber are of exactly the same construction as chamber O, and the valve therein is operated in exactly the same manner as will be seen by reference to Fig. 5.

W is the brake cylinder arranged preferably beneath the center of car base A, and a little to the rear of the pump and reservoir and communicating with its forward end is pipe U extending thereto from the valve mechanism, as above explained. A piston head X movable in said cylinder actuates the rod X' to the outer end of which is loosely connected the upper end of lever Y having the forwardly extending bend Y' in its upper portion and encircled near its lower end by eye V' secured to the rear side of brake bar C'. The lower end of lever Y which depends below the brake bar, is loosely connected to the rear end of the forwardly extending rod $b$, which at its opposite end is loosely secured to the rear side of brake bar Z, operating upon the forward wheels of the car. The said brake bars are supported in their proper position by the hangers $d$. Thus it will be seen that when the piston head X is moved rearward in the cylinder W, the upper end of lever Y will also be forced rearward bringing the brake bar C' in position upon the rear wheels upon which it operates, and the said brake bar being thus set acts as a fulcrum for the said lever, so that as the rearward movement of the upper end of the said lever is continued the lower end thereof will be moved forward forcing bar Z, into position through the medium of rod $b$, thereby setting the same. The brake may be held in this manner as long as desired and may be instantly released by opening the small valve in chamber V.

A pressure regulator $e$, of ordinary construction may be applied to the reservoir E, and thus prevent the accumulation of too great a pressure therein.

The brake may be instantly applied and as quickly released by simply depressing the aforesaid valves without any material exertion on the part of the driver or motorman. It is apparent that the controlling mechanism may be arranged upon the car platform or within the car as may be desired, its efficiency not depending upon any particular location of the said mechanism.

Having thus described my invention, what I claim, and desire to secure by Letters Patent, is—

In a street car brake, the combination of a vertical valve casing O secured at the car front, the horizontal partition Q therein forming upper and lower chambers O'', O', and provided with port Q' between the chambers, the vertically movable valve R in the lower chamber, the spring R' between said valve and the bottom of the casing, the stem S extending out through the top of the casing and provided with controlling means, the auxiliary casing V on casing O and opening into chamber O'' and provided with a spring held valve controlling its outlet having controlling means, an air reservoir connected with chamber O', and a brake cylinder connected with chamber O'', as set forth.

In testimony whereof I affix my signature in presence of two witnesses.

ALONZO M. MENTZER.

Witnesses:
JOHN B. HALLER,
J. H. MELCHIOR.